United States Patent
Chauhan et al.

(10) Patent No.: US 11,360,822 B2
(45) Date of Patent: Jun. 14, 2022

(54) INTELLIGENT RESOURCE ALLOCATION AGENT FOR CLUSTER COMPUTING

(71) Applicant: Bank of America Corporation, Charlotte, NC (US)

(72) Inventors: Sandeep Kumar Chauhan, Hyderabad (IN); Sheetal Bhatia, Maharashtra (IN); Kritika Rai, Maharashtra (IN); Anuranjan Kishore, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 142 days.

(21) Appl. No.: 16/569,223

(22) Filed: Sep. 12, 2019

(65) Prior Publication Data

US 2021/0081250 A1 Mar. 18, 2021

(51) Int. Cl.
*G06F 9/50* (2006.01)
*G06N 20/00* (2019.01)
*G06N 3/08* (2006.01)

(52) U.S. Cl.
CPC ............ *G06F 9/5055* (2013.01); *G06F 9/505* (2013.01); *G06F 9/5011* (2013.01); *G06F 9/5044* (2013.01); *G06N 20/00* (2019.01); *G06F 9/5027* (2013.01); *G06F 2209/501* (2013.01); *G06F 2209/503* (2013.01); *G06F 2209/508* (2013.01); *G06F 2209/5019* (2013.01); *G06N 3/08* (2013.01)

(58) Field of Classification Search
CPC .... G06F 9/5055; G06F 9/5011; G06F 9/5044; G06F 2209/508; G06F 2209/503
See application file for complete search history.

(56) References Cited

U.S. PATENT DOCUMENTS

| | | | |
|---|---|---|---|
| 8,621,477 B2 | 12/2013 | Ferdous et al. | |
| 9,430,288 B2 | 8/2016 | Wilson et al. | |
| 9,612,878 B2 | 4/2017 | Di Balsamo et al. | |
| 9,870,251 B2 | 1/2018 | Baracaldo Angel et al. | |
| 10,241,826 B2 | 3/2019 | Baracaldo-Angel et al. | |
| 10,762,539 B2* | 9/2020 | Murugesan | G06Q 30/0275 |
| 2003/0070157 A1* | 4/2003 | Adams | G06F 8/77 717/101 |
| 2010/0281166 A1* | 11/2010 | Buyya | G06F 9/5072 709/226 |

(Continued)

*Primary Examiner* — Abu Zar Ghaffari
(74) *Attorney, Agent, or Firm* — Banner & Witcoff, Ltd.

(57) ABSTRACT

A resource allocation module may be configured to monitor an input queue of a cluster computing framework for a batch of one or more programs for processing. The resource allocation module parses commands in each of the one or more programs to determine an input/output (I/O) complexity parameter and at least one operation complexity parameter corresponding to each program of the one or more program files. The resource allocation module triggers execution of the one or more program files by a cluster computing framework via a network communication, wherein the cluster computing framework is configured based on the I/O complexity parameter and the at least one operation complexity parameter. Based on analysis of feedback from the cluster computing framework, the resource allocation module modifies a calculation for determining the I/O complexity parameter and/or a calculation for determining the operation complexity of the program files.

20 Claims, 7 Drawing Sheets

(56) References Cited

U.S. PATENT DOCUMENTS

| | | | |
|---|---|---|---|
| 2012/0213359 A1* | 8/2012 | Troncoso Pastoriza | ..................... H04L 9/008 380/28 |
| 2017/0090975 A1* | 3/2017 | Baracaldo Angel | ...... G06F 9/46 |
| 2018/0300176 A1* | 10/2018 | Chen | ..................... G06F 9/4887 |
| 2019/0042870 A1* | 2/2019 | Chen | .................... G06K 9/6215 |
| 2019/0228303 A1* | 7/2019 | Liu | ....................... G06F 9/5011 |
| 2019/0324759 A1* | 10/2019 | Yang | ..................... G06N 3/084 |
| 2020/0311573 A1* | 10/2020 | Desai | .................... H04L 41/147 |
| 2021/0232894 A1* | 7/2021 | Yamada | .................. G06N 3/04 |

* cited by examiner

INTELLIGENT RESOURCE ALLOCATION AGENT FOR CLUSTER COMPUTING

BACKGROUND

Aspects of the disclosure relate to managing resources of a cluster computing system. One or more aspects of the disclosure relate to an intelligent resource management agent capable of determining a complexity of each input file of a plurality of input files and allocating computing resources based on that determination.

For many organizations, such as business organizations, governmental organizations, educational organizations and the like, networked computing resources represent an important, but finite, resource that allows the enterprise to provide products and services to their employees and customers. For example, the enterprise may utilize the computing resources in software development, running applications and computer-based services, performing large-scale data analytics, and the like. To maximize computing efficiency (e.g., processing efficiency, memory usage efficiency, network bandwidth efficiency, and the like), the enterprise may utilize a cluster computing framework such as when managing manage data intensive and/or operation intensive operations. For example, an enterprise may configure a plurality of workstations (e.g., nodes) within a cluster computing framework to provide distributed services, such as storage services, processing services, and the like.

While cluster computing frameworks may provide a way to program computing clusters with implicit data parallelism and fault tolerance, however, runtime configurations are often reliant upon experience of a user to provide an effective processing environment. Further, experienced users may not always fully understand the system requirements for each program to be executed in the queue, thus causing inefficient memory allocation and/or inefficient processor time management and use. As such, a need has been recognized for a computing system capable of dynamically allocating cluster computing resources (e.g., memory, processors, servers, and the like) and adapting the cluster the allocations in future runs based on system feedback to autonomously allocate hardware resources, processor resources, and memory resources.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity.

In some cases, a resource allocation module may be configured to monitor an input queue of a cluster computing framework for a batch of one or more programs for processing. The resource allocation module parses commands in each of the one or more programs to determine an input/output (I/O) complexity parameter and at least one operation complexity parameter corresponding to each program of the one or more program files. The resource allocation module triggers execution of the one or more program files by a cluster computing framework via a network communication, wherein the cluster computing framework is configured based on the I/O complexity parameter and the at least one operation complexity parameter. Based on analysis of feedback from the cluster computing framework, the resource allocation module modifies a calculation for determining the I/O complexity parameter and/or a calculation for determining the operation complexity of the program files.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
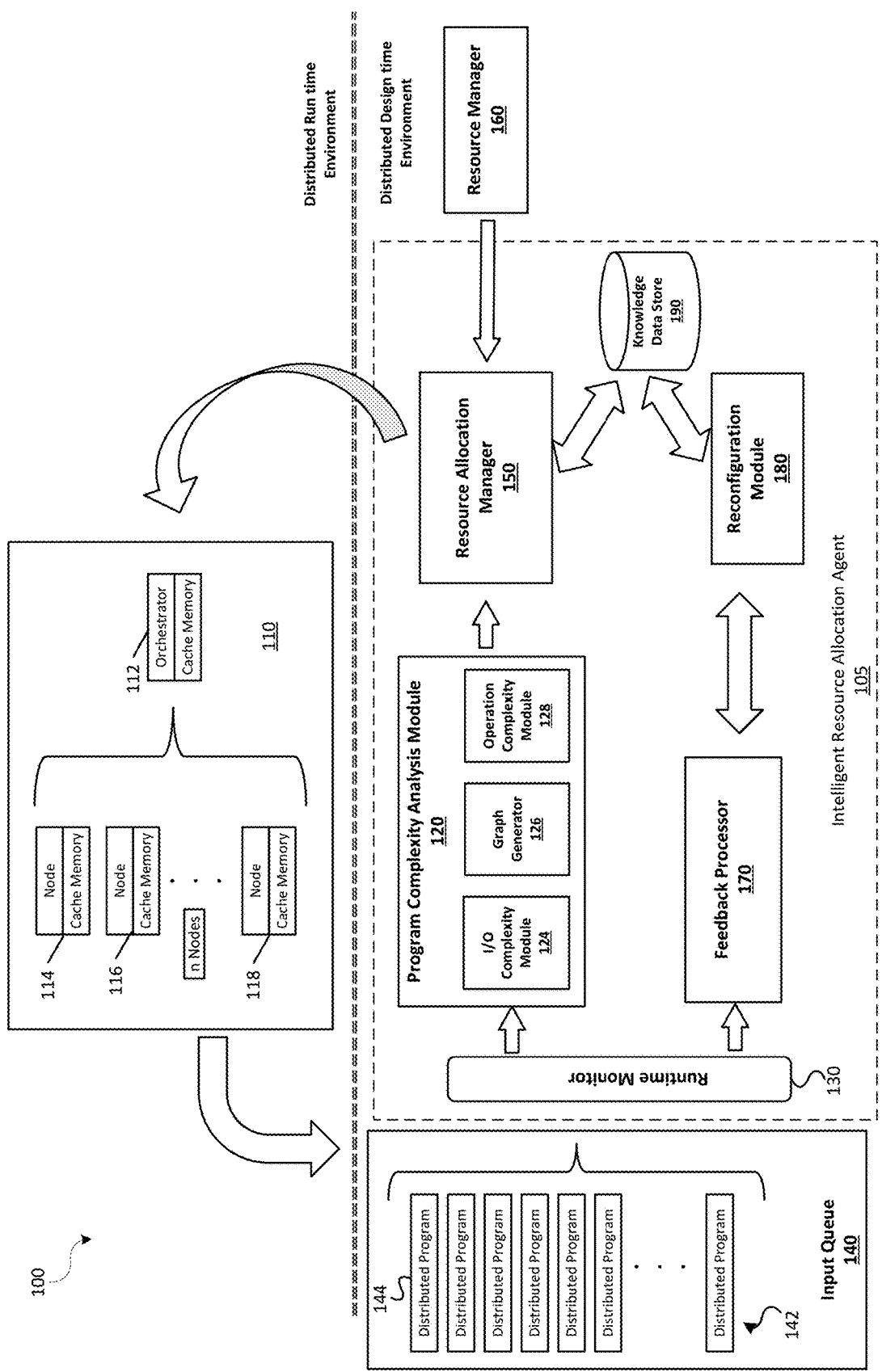
FIG. 1 shows an illustrative cluster computing environment for implementing an intelligent resource allocation agent service in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

In many cases, many cluster computing frameworks may provide a way to program computing clusters with implicit data parallelism and fault tolerance. However, such cluster computing frameworks may rely upon programmer experience to provide to perform system configuration of computing resources (e.g., processing power, available memory, communication efficiency, and the like) when processing programs in an input queue. However, even experienced programmers and system administrators often fail to allocate system resources properly. Often, these configurations may provide an effective run time processing environment with system resources being over-allocated, so that overall system effectiveness and throughput is reduced. Further, in many cases, the system resources may be under-allocated or run with an improper execution policy (e.g., First Come-First Served, Long Job First, and the like) so that programs may execute slowly and/or high priority jobs may be interrupted or not started due to system resources being taken by loser priority programs. As such, a need was recognized for an intelligent resource allocator capable of managing efficient allocation of cluster computing resources and for autonomously learning and improving the allocations of resources for future runs and based on system feedback.

In some cases, a cluster computing framework may be provided as a single source system from a particular cluster computing provider or as an open-source cluster computing framework. Often these cluster computing frameworks provide a processing engine to perform extract, transfer and load (ETL) functions, analytics, machine learning, and or graph processing on large volumes of data (e.g., batch processing, stream processing, and the like) based on one or more high-level application programming interfaces (APIs) that support one or more programming languages, such as Scala, Python, Java, R, SQL, and the like. Cluster computing frameworks provide users a library of operators for use in application development, such as libraries for batch analytics, dataset queries, real-time analysis, machine learning, graph processing, and the like.

Often, the cluster computing framework may include a cluster manager and a distributed data storage system that may support different data structures, such as a resilient distributed data set, that may be a set of data items distributed over the machines comprising the cluster computing framework. These resilient distributed data sets may be used as a working data set for distributed programs. In some cases, the cluster computing framework may use shared memory (e.g., the resilient distributed dataset) to dispatch and/or schedule tasks and/or to handle at least a portion of input/output (I/O) functionalities.

An intelligent resource allocation agent, as discussed in this disclosure, may calculate a complexity for a number of programs and/or jobs in an input queue, based on type of operations being performed and/or a type of data access (e.g., local memory access, data storage device (e.g., a disk drive, a tape drive, a solid state memory device, and the like) access, network access, and the like) used by the operations. The intelligent resource allocation agent may also determine an execution policy such as First come-First Served (FCFS), Long Job First (LJF), Highest Complexity Job First (HCJF), and the like, for a list of analyzed programs in the queue. In some cases, the intelligent resource allocation agent executes in a semi-supervised fashion using one or more machine learning algorithms to continually improve program complexity calculations, memory-use complexity calculations, and considering available resources, such as processor usage, I/O processing queues, node usage, processor time management use, latency parameters, and/or other system usage parameters.

In some cases, the intelligent resource allocation agent may include one or more computing devices processing instructions, that when executed by a processor, cause the intelligent resource allocation agent to provide a runtime monitor, a program complexity analysis module, a resource allocation manager, a feedback processor, and a reconfiguration module. The intelligent resource allocation agent may also include one or more data stores, such as a knowledge data store. The program complexity analysis module may calculate a complexity of each job or program in an input queue and may determine an operational complexity and/or an I/O complexity such as by using a complexity graph generator. The resource allocation manager may perform an intelligent allocation of cluster computing resources based on infrastructure information received from a resource manager of the cluster computing framework along with I/O complexity analysis and program complexity analysis information from the program complexity analysis module. The feedback processor may monitor execution of the programs by the cluster computing environment and/or analyze data logs provided by the cluster computing environment and store feedback information in a knowledge data store for use by one or more machine learning algorithms to improve complexity calculations by the program complexity analysis module and/or resource allocation by the resource allocation manager.

In a simplified example, the intelligent resource allocation agent may identify a number of programs in a queue ready for processing. The program complexity analysis module may analyze commands in each of the programs to determine a complexity of the program execution and/or the complexity of I/O usage. Based on this information, and a knowledge base of previous cluster computing operations, the resource allocation manager may then analyze the program complexity and I/O complexity of the programs, an amount of available resources of the cluster computing environment (e.g., available nodes, available memory, and the like), and efficiency variables (e.g., latency parameters, network usage parameters, and the like) to optimize the execution of the programs in the queue. For example, the resource allocation manager may allocate a number of nodes (e.g., a primary node and one or more worker nodes), allocate memory and/or processors to the nodes to execute the programs, and the like. A feedback monitor may collect data associated with the processing of the programs by the cluster computing environment, such as data logs, and a feedback processor may analyze the cluster computing feedback, along with the program complexity calculations and other system parameters, such as by using a machine learning algorithm, to identify improvements that may be made to the program complexity calculations, the I/O complexity calculations, a program execution policy (e.g., FCFS, LJF, HCJF, and the like), along with other parameters. The feedback processor may then update the information stored in the knowledge database for use in future program complexity calculations, I/O complexity calculations, and resource allocation of the cluster computing system.

FIG. 1 shows an illustrative cluster computing environment 100 for implementing an intelligent resource allocation agent service in accordance with one or more aspects described herein. The illustrative cluster computing environment 100 includes a plurality of computing devices in a cluster computing system 110 (e.g., workstations, servers, and the like) configured in a distributed runtime environment, including a plurality of nodes (e.g., workers, executors, and the like), such as node 114, node 116, and node 118, and an orchestrator 112 (e.g., primary). Additionally, the illustrative cluster computing environment 100 also includes a distributed design time environment including an intelligent resource allocation agent 105 communicatively coupled to an input queue 140 and a resource manager for the cluster computing framework. The illustrative intelligent resource allocation agent 105 includes a runtime monitor 130, a program complexity analysis module 120, a resource allocation manager 150, a feedback processor 170, a reconfiguration module 180, and a knowledge data store 190. Further, the illustrative program complexity analysis module 120 includes an I/O complexity module 124, a graph generator 126, and an operation complexity module.

In some cases, the runtime monitor 130 of the intelligent resource allocation agent 105 may monitor inputs to the cluster computing system 110 (e.g., the input queue 140) and outputs of the cluster computing system such as, for example, execution logs providing information regarding program execution efficiency and computing resource status. For example, the runtime monitor 130 may monitor the input queue 140 to determine whether a batch of programs have been queued for processing. In some cases, the runtime monitor 130 may identify that a batch of programs 142 has been loaded in the input queue and then trigger the program complexity analysis module 120 to parse each program 142 of one or more of programs 144 of the batch. In some cases, programs may be loaded in the input queue, as individual programs or batches of programs, until a threshold number of programs has been reached before triggering the program complexity analysis module 120 to parse each program 142 of one or more of programs 144 in the input queue. Additionally, the runtime monitor 130 may monitor execution logs and other execution status information output by the cluster computing system 110 following completed execution of the programs in a processed batch, as discussed in more detail below.

The program complexity analysis module 120 may analyze the one or more programs 142 entered in the input queue to identify a complexity of operations performed in each program 144 and a complexity of I/O usage required by the operations in each program 144. In some cases, the I/O complexity module 124 may analyze the I/O complexity of each program 144 and the operation complexity module 128 may analyze the complexity of the operations of each program 144. The graph generator 126 may process complexity information determined by each of the I/O complexity module 124 and the operation complexity module 128 to output the complexity information in a format readable by a human, in a format readable by the resource allocation manager 150 or a combination of formats. In some cases, the program complexity analysis module 120 may store complexity information in a knowledge data store for future analysis and comparison by the feedback processor 170, the reconfiguration module 180, the resource allocation manager 150 and/or the program complexity analysis module 120.

The program complexity analysis module 120 may analyze operations performed by one or more programs 144 to be processed by the cluster computing system 110 and may determine a plurality of complexity parameters that characterize the operation complexity of the program. For example, the program complexity analysis module 120 may determine a computational weighting parameter corresponding to a number of computation intensive operations to be performed in the program (e.g., a map operation, a filter operation, a sample operation, an intersection operation, a shuffle operation, and the like). Additionally, the program complexity analysis module 120 may determine a worker node weighting parameter corresponding to operations that may require data to be obtained from a different source or file (e.g., a load from file operation, a union operation, a join operation, a distinct operation, a join operation, an aggregate operation, and the like) and/or may require multiple worker nodes to perform. Other operational complexity parameters may include a total worker memory weight parameter corresponding to a size of one or more input files and/or a data source file and may be divided between the different worker nodes, a primary memory parameter corresponding to a sum of all data source file sizes because the primary node is responsible for aggregating data from all worker nodes, a memory access parameter corresponding to a number of times that memory (e.g., random access memory (RAM)) is accessed and has the fastest execution time of all data access methods, a disk access parameter corresponding to a number of times the program access a disk to load a file or during other operations, a network access parameter corresponding to a number of times data access is performed through a network connection, which is the slowest data access method. In some cases, the program complexity analysis module 120 may analyze one or more additional parameters, such as those associated with operation of the cluster computing framework and including, for example, a distance parameter corresponding to location differences between nodes, a delay latency parameter, a time to run latency parameter, and the like.

Figure 3:
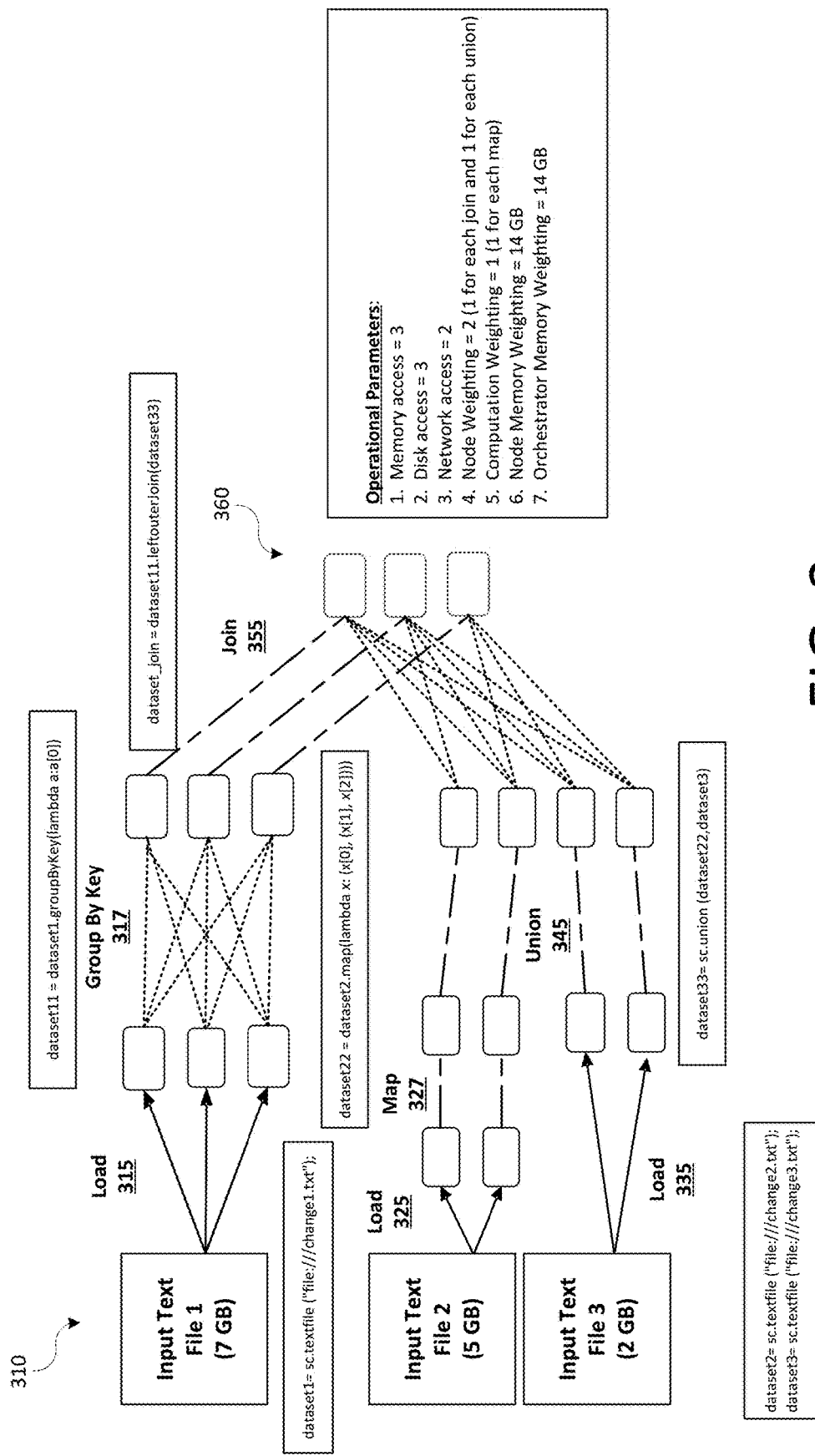
FIG. 3 shows an illustrative operation complexity graph in accordance with one or more aspects described herein.

In some cases, the program complexity analysis module 120 may parse an executable script of the program 144 to determine operations being called, data accessed from RAM, data accessed from a disk, data access and/or communication via a network, and the like. For example, the program complexity analysis module 120 pay include a preprocessor module (not shown) to parse the program 144 before further complexity analysis by the operations complexity module 128 and the I/O complexity module perform an analysis of the parsed operations. In some cases, the complexity analysis may include a static analysis based on one or more operations in the program. In some cases, weightings used in performing the analysis may need to be trained, such as by using a supervised machine learning algorithm (e.g., logistic regression, and the like), an unsupervised machine learning algorithm (e.g., an apriori algorithm, and the like), a decision tree algorithm (e.g., a conditional decision tree, and the like), a Bayesian machine learning algorithm (e.g., Naïve Bayes algorithm, a Bayesian network, and the like), a neural network (e.g., stochastic gradient descent, back-propagation, and the like), and or other machine learning algorithms. In an illustrative example, an administrator may initialize the tuning on a first use of the program complexity analysis module 120 by scanning the executable code and providing an initial weighting set including an initial weighting value associated with each parameter discussed above. Based on feedback from the system after processing a batch of input programs, the program complexity analysis module 120 may modify the weightings based on machine learning algorithm analysis of weightings associated with particular operations and/or data access types and adjusting the weightings based on the feedback. For example, an operation may be associated with a high complexity weighting factor or multiplier (e.g., 0.8), but an analysis of the data logs from the cluster computing system 110 following execution may find that the operations executed faster than expected. Based on this feedback, the weighting value may be adjusted to a lower value (e.g., 0.7) based at least upon the execution time, where the new weighting will be applied in the next analysis cycle. FIG. 3 shows an illustrative operation complexity graph 300 as performed by operation complexity module 128 and graphed by the graphing module 126, in accordance with one or more aspects described herein. In the illustrative example, a program (e.g., program 144) may be analyzed to first identify inputs 310 and/or outputs 360 of the program 144. In the illustrative example, the program accesses three input files, input text file 1 storing 7 GB of data, input text file 2 storing 5 GB of data, and input text file 3 storing 2 GB of data, where each input text file is loaded by the load operations 315, 325, and 335, respectively. The program executable includes an operation to (e.g., group by key 317) to aggregate the data via the network, a command to map the data of input text file 2 into memory (e.g., map 327) and a command to combine the data of text file 2 with the data of text file 3 (e.g., union 345), and an operation to join the first data set of text file 1 that has been grouped by a key with the combined data set resulting from the union of the data sets from input text file 2 and input text file 3. Based on the parsing, the operation complexity module may determine values for one or more operational parameters that may be used by the resource allocation manager 150 when allocating resources to process the program 144, such as a memory access parameter, a disk access parameter, a network access parameter, a node weighting parameter, a computation weighting parameter, a node memory weighting parameter, and an orchestrator memory weighting parameter.

In the illustrate example of FIG. 3, the operation complexity module 128 may assign a value of 3 for the memory access parameter (e.g., a value of 1 for each of the map command 327, the union command 345, and the join command 355), a value of 3 for the disk access parameter (e.g., a value of 1 for each of the load command 315, the load command 325, and the load command 335), a value of 2 for the network access parameter (e.g., a value of 1 for each of the group by key command 317 and the join command 355), a value of 2 for the node weighting parameter (e.g., a value of 1 for each of the join command 355 and the union command), a value of 1 for the computation weighting parameter (e.g., a value of 1 the map command), a value of 14 GB for the node memory weighting parameter (e.g., a total memory requirement for all input files associated with the program), and a value of 14 GB for the orchestrator memory weighting parameter (e.g., a total memory requirement for all worker nodes managed by the orchestrator node). In some cases, each parameter value may be adjusted, such as by a multiplier, based on the machine learning algorithms processing the cluster computing log files detailing the results of execution of one or more previous program batches. In some cases, a weighting factor may be associated with a particular command, memory access type, I/O access type and/or based on an amount of memory being accessed.

For example, an operation complexity parameter value may be calculated with an equation:

Operation Complexity parameter=sum($BV_1*AF_1$, $BV_2AF_2$, . . . ,$BV_nAF_n$), where $BV_1$ is a base value associated with a first operation, $AF_1$ is an adjustment factor associated with the first operation, . . . , and $BV_n$ is a base value associated with an $n^{th}$ operation, and $AF_n$ is an adjustment factor associated with the $n^{th}$ operation. In the example illustrated in FIG. 3, the memory access parameter may be calculated as MA= ($BV_{map}*AF_{map}+BV_{union}*AF_{union}\pm BV_{join}*AF_{join}$)=1+1+ 1=3. As illustrated, all base values and adjustment factors are shown to have a value of 1 to result for a memory access parameter value of 3. However, as part of the machine learning process, the feedback processor 170 may determine that a particular operation (e.g., join) may take longer to execute than expected but another operation (e.g., map) may take less time to execute than expected by the feedback processor 170. As such, the base value, the adjustment factor, or both for the identified operations may be adjusted by the reconfiguration module 180. For example, in a subsequent run, the memory access parameter may be calculated with the adjusted base value and/or weighting factors, such as MA=($BV_{map}*AF_{map}+BV_{union}*AF_{union}+BV_{join}*AF_{join}$)=1*0.9+1*1+1*(1.3)=3.2. Similar equations may be used to calculate other complexity parameters as well. In some cases, additional adjustment factors and/or base value adjustments may be assigned based feedback derived from on one or more other parameters, such as system parameters including, for example, a time of day of program execution, a geographical distance between a file storage location and a location of a worker node, and the like.

Figure 2:
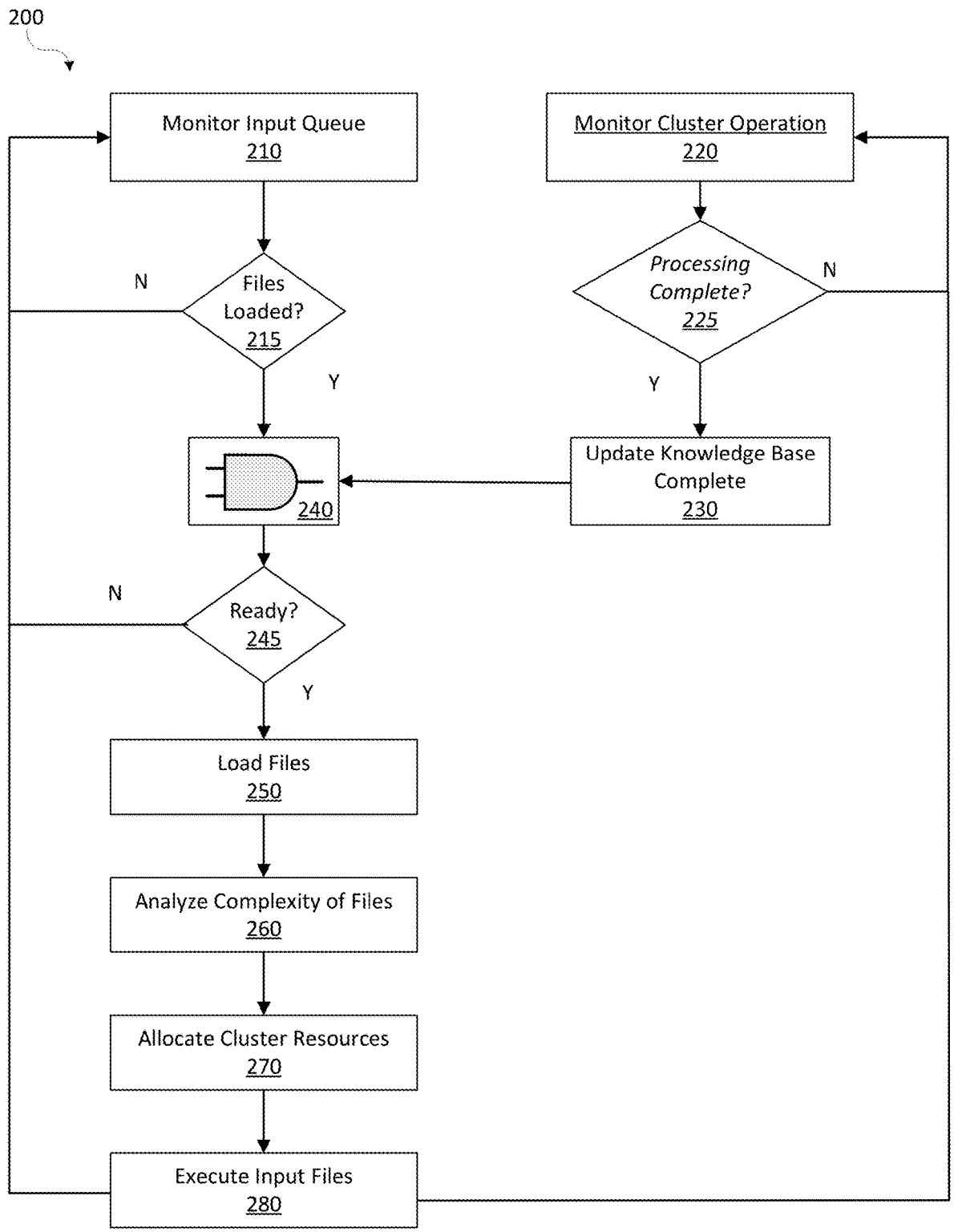
FIG. 2 shows an illustrative method for intelligent resource management in a cluster computing environment in accordance with one or more aspects described herein.
Figure 4:
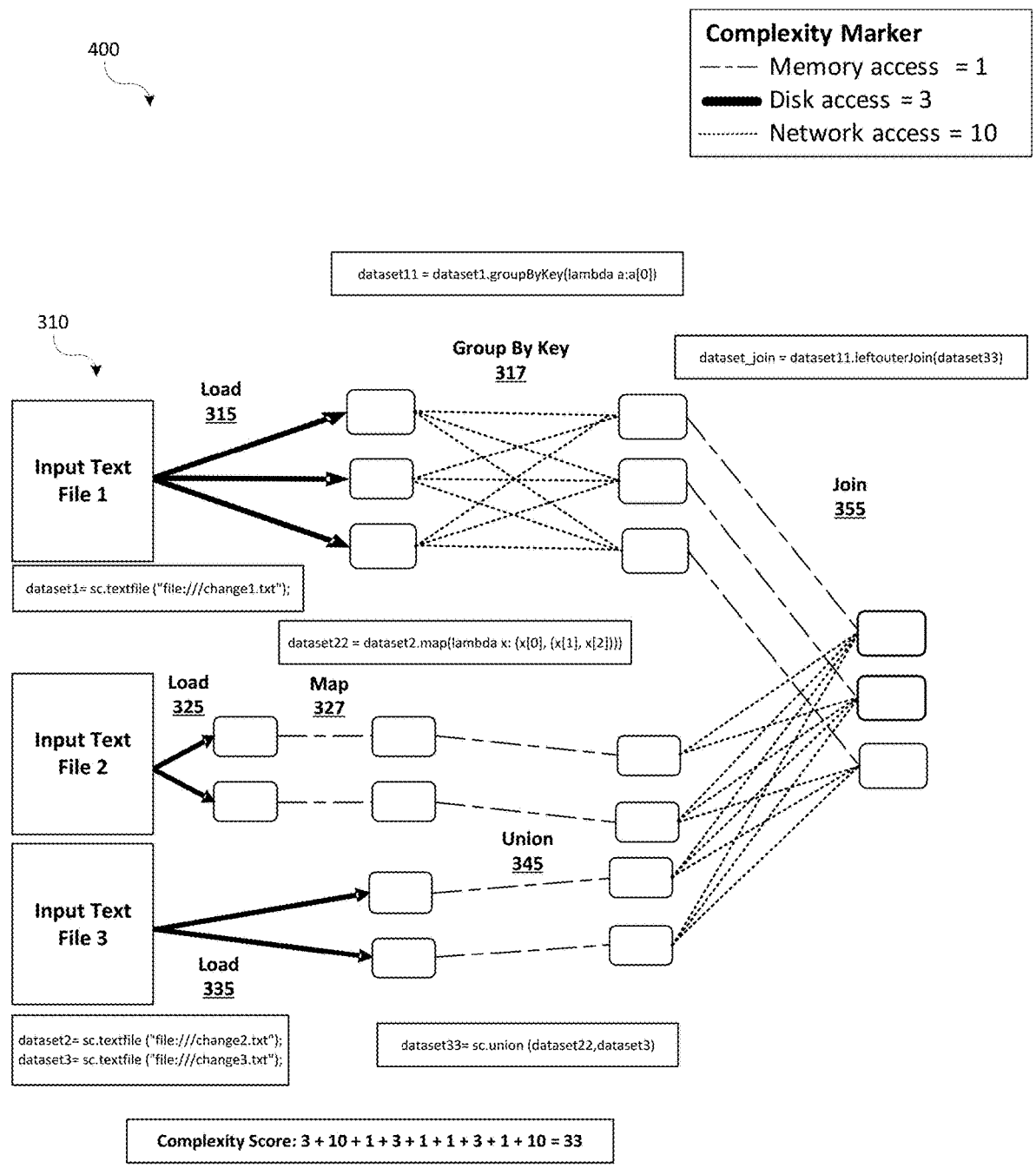
FIG. 4 shows an illustrative I/O complexity graph in accordance with one or more aspects described herein.
Figure 5:
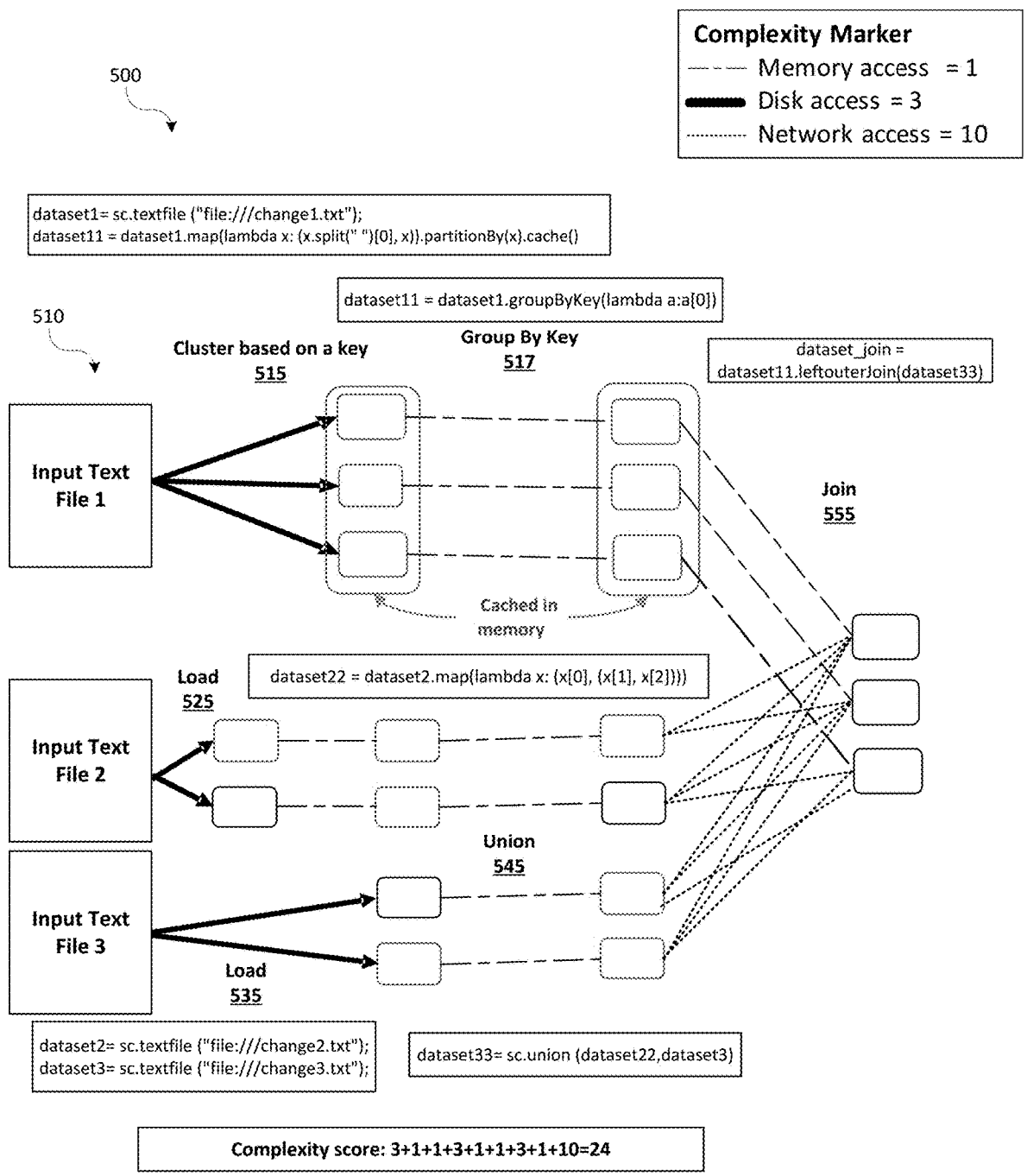
FIG. 5 shows an illustrative I/O complexity graph with cached memory access in accordance with one or more aspects described herein.

FIGS. 4 and 5 illustrative I/O complexity graphs 400, 500 as analyzed by the I/O complexity module 124 and graphed by the graph generator 126 in accordance with one or more aspects described herein. For example, FIG. 4 shows an illustrative I/O complexity value for the operations of program 144 as shown in FIG. 2. As can be seen, a complexity value is associated with a type of I/O access, such as memory access (e.g., 1), disk access (e.g., 3), and network access (e.g., 10). As shown in FIG. 4, each operation (e.g., load 315, group by key 317, join 355, and the like) are associated with a memory access type. In some cases, an operation may utilize one or more memory access types to complete. For example, a union operation may require use of two or more different memory access transactions to create a union of two or more data sets. Similarly, a join command may utilize two or more memory access transactions to join two or more data sets. The I/O Complexity parameter value may be calculated using an equation, such as:

I/O Complexity=sum($BV_1*AF_1,BV_2AF_2, \ldots ,BV_nAF_n$), where $BV_1$ is a base value associated with a first operation, $AF_1$ is an adjustment factor associated with the first operation, . . . , and $BV_n$ is a base value associated with an $n^{th}$ operation, and $AF_n$ is an adjustment factor associated with the $n^{th}$ operation. Here, each I/O access method (e.g., memory, disk, network, and the like) may be associated with a particular base value such as, for example, a base value for a command utilizing memory access may equal 1, a base value for a command utilizing disk access may equal 3, and a base value for a command utilizing network access command may equal 10, with the adjustment factor originally set to a value of 1. In the illustrative program operation shown in FIG. 4, the I/O complexity may be calculated as I/OC= ($BVio_{load}*AFio_{load}+BVio_{load}*AFio_{load}+BVio_{load}*AFio_{load}+BVio_{GBK}*AFio_{GBK}+BVio_{map}*AFio_{map}+(BVio_{union}*AFio_{union}+BVio_{union}*AFio_{union})+(BVio_{join}*AFio_{join}+BVio_{join}*AFio_{join})$)=3+3+3+10+1+(1+1)+(1+10)=33. As discussed above with respect to the machine learning process utilized by the feedback processor 170 may determine that a I/O utilization by a particular operation (e.g., join) may take longer to execute than expected but another operation (e.g., map) may take less time to execute than expected by the feedback processor 170. As such, the base value, the adjustment factor, or both for the identified operations may be adjusted by the reconfiguration module 180. For example, in a subsequent run, the memory access parameter may be calculated with the adjusted base value and/or weighting factors, such as I/OC=3+3+3+10+1*(0.5)+ (1+1)+(1*(1.5)+10*(1.5))=38. In some cases, additional adjustment factors and/or base value adjustments may be assigned based on feedback derived from on one or more other parameters, such as system parameters including, for example, a time of day of program execution, a geographical distance between a file storage location and a location of a worker node, and the like.

FIG. 5 shows an illustrative I/O complexity graph 500 as analyzed by the I/O complexity module 124 and graphed by the graph generator 126, where the program 144 replaces the load command 315 with a different command that loads the input text file 1 into local memory (e.g., cluster based on a key command 515). In this example the I/O complexity score is reduced significantly due to the group by key command 317 causing loading of data to local memory, such that the group by key command operates using local memory, rather than operating via a network. For example, $FOC=(BVio_{load}*AFio_{load}+BVio_{load}*AFio_{load}+BVio_{CBK}*AFio_{CBK}+BVio_{GBK}*AFio_{GBK}+BVio_{map}*AFio_{map}+(BVio_{union}*AFio_{union}+BVio_{union}*AFio_{union})+(BVio_{join}*AFio_{join}+BVio_{join}*AFio_{join}))=3+3+3+1+1+(1+1)+(1+10)=24$. IN some cases, the program complexity analysis module 120 and/or the resource allocation manager 150 may suggest a change in operator use based on an analysis of operator use in a program, such as based on the analysis and information stored in the knowledge data store 190. In some cases, the program complexity analysis module may set a parameter indicating program execution by the cluster computing framework 110 may be improved, such as by substituting one or more operators specified in the program with a different operator or sequence of operators. In some cases, program complexity analysis module 120, the resource allocation manager 150, the feedback processor 170, and/or the reconfiguration module 180 may output a suggestion to modify the program to a user via a user interface, a message, or other electronic notification before program execution, after program execution has been analyzed and/or a combination.

Returning to FIG. 1, the resource allocation manager 150 may analyze operation complexity information (e.g., graphs, parameters, and the like) and I/O complexity information (e.g., graphs, parameters, and the like) along with information stored in the knowledge data store 190, such as operation complexity information, I/O complexity information stored with respect to previous program execution operation by the cluster computing framework, cluster computing operation feedback information gathered and analyzed by the feedback processor 170, cluster computing configuration parameters set by the reconfiguration module 180 based on previous operation of the cluster computing framework, cluster computing system resource parameters such as those communicated by the cluster computing framework (e.g., by the resource manager 160 of the cluster computing framework) and the like. For example, the program complexity analysis module 120 may communicate operation complexity information and I/O complexity information corresponding to each program 144 of the plurality of programs 142 in the input queue. The resource allocation manager may further receive cluster computing system status information from the resource manager 160 and corresponding to the current operational state of the cluster computing framework. Based on this information, the resource allocation manager 150 may allocate cluster computing resources of the cluster computing system 110 to optimize execution of the programs to, for example, execute an identified high priority program in a timely manner, assign worker nodes and processors to reduce redundancies in node assignments and/or prevent resource shortfalls, to reduce memory usage requirements and assign memory resources to reduce latencies caused by data access limitations, to reduce latencies caused by program switching and interruptions by higher priority jobs, and the like. For example, the resource allocation manager may determine whether sufficient processing resources (e.g., nodes, memory, network bandwidth, processor availability, and the like) is available to allow all programs to be executed in parallel. If so, the resource allocation manager 150 may assign resources based on the I/O and operation complexity information, system parameters and historical information stored in the knowledge base corresponding to historical program processing runs by the cluster computing framework. If not, and based on this information, the resource allocation manager may identify a program processing scheme for the plurality of programs 142 to optimized use of the cluster computing framework resources, such as by allocating enough memory for processing without over committing memory resources in a way that adversely affects cluster computing operation, assigning worker nodes and processor cores such that nodes wait time and latency times are reduced, and the like. For example, processing schemes may include processing a highest complexity program first, processing the programs as they appear in the queue, processing a highest priority program first, and the like. In some cases, the resource allocation manager 150 may process all programs in the queue based on a same scheme or may group programs where each group may be processed in a different manner. For example, an input queue may include 7 programs, where 2 programs are high priority and the remaining 5 are low priority. The resource allocation manager 150 may then assign cluster computing resources and specify that the 2 high priority programs operate using a highest complexity first scheme, while the 5 remaining programs be processed in a first come, first served scheme, either after the higher priority programs complete or in parallel operation depending on available resource parameters and historical information in the knowledge data store.

In an illustrative example, the resource allocation manager 150 may assign a weight to each program based on the I/O complexity information and/or the Operation complexity information. Additionally, the resource allocation manager 150 may assign a multiplier to each program corresponding to an indicated priority of the job. For example, a program execution weight ($PE_{weight}$) may be assigned to each program using the formula $PE_{weight}=P(I/OC_{weight}+OC_{weight})$, where P is a priority multiplier, $OC_{weight}$ is an operation complexity weighting, and $I/OC_{weight}$ is an I/O complexity weighting.

As mentioned, the runtime monitor 130 may be configured to monitor both the input queue 140 and feedback received from the cluster computing system 110. In some cases, the runtime monitor 130 may monitor runtime parameters of the cluster computing network (e.g., operation status parameters, program execution status parameters, and the like). In some cases, the runtime monitor 130 may monitor creation of feedback logs to identify a completion of program operation and/or batch operation of the cluster computing system 110. The runtime monitor may store captured parameter information, parse program logs, or otherwise aggregate runtime data corresponding to a program batch execution run. This information may be associated with the I/O complexity information and operation complexity graphs produced for the program batch and all information may be stored in the knowledge data store 190 for use by the resource allocation manager and/or the reconfiguration module 180.

The reconfiguration module 180 may analyze the feedback information captured by the runtime monitor 130 and associated with the I/O complexity information and operation complexity information. Based on this analysis, the reconfiguration module may update parameters used by the resource allocation manager 150 and the program complexity analysis module 120. For example, the reconfiguration module 180 may process one or more machine learning algorithms to improve weightings assigned to I/O complexity parameters and/or operation complexity parameters. Additionally, the reconfiguration module 180 may process one or more machine learning algorithms to improve a weighting associated with each of the I/O complexity parameters and/or the operation complexity parameters. In some cases, the reconfiguration module 180 may associate a system parameter to different values of the I/O complexity parameters and/or the operation complexity parameters, such as by associating a first weighting for operations scheduled or predicted to occur during a time having historically high network traffic conditions and a second weighting for operations schedule or predicted to occur during a time having historically low network traffic conditions, and the like. The reconfiguration module 180 may monitor operation and/or data input to each of the runtime monitor 130, the program complexity analysis module 120, the resource allocation manager 150, the resource manager 160, and the feedback processor 170. Further, the reconfiguration module 180 may communicate updated information to each of the runtime monitor 130, the program complexity analysis module 120, the resource allocation manager 150, the resource manager 160, and the feedback processor 170 at set times, continuously, and/or may update corresponding entries in the knowledge data store 190 for use by the respective system components as needed.

FIG. 2 shows an illustrative method 200 for intelligent resource management in a cluster computing environment 100 in accordance with one or more aspects described herein. For example, at 210 the runtime monitor 130 may monitor the input queue 140 for an indication that a program 144 or a batch comprising one or more programs 142 is ready for processing. In parallel, the runtime monitor may monitor operation of the cluster computing system 110 such as by monitoring cluster computing runtime parameters and/or for an output cluster computing data logs such as my monitoring a specified log folder or data storage location at a specified network location. At 215, the runtime monitor 210 may determine whether programs or batches of programs in the input queue 140 are ready for processing, such as by identifying an execute input, a threshold condition corresponding to a number of programs or batches of programs being met. Additionally, in some cases in parallel, the runtime monitor 130 may determine whether a processing of a batch of programs has completed at 225. If so, the knowledge based may be updated at 230. If the input queue 140 is determined to not be loaded at 215, or the processing of a current batch of programs has not been completed, the runtime monitor continues to monitor the input queue at 210 and to monitor operation of the cluster computing system 110 at 220.

At 240, the runtime monitor may determine whether the one or more programs 142 in the input queue 140 are ready for processing and/or whether an update of the knowledge base has completed. If so, the runtime monitor 130 may determine whether a batch of the one or more programs 142 are ready to be analyzed by the program complexity analysis module 120 is ready to process the batch. If not, the runtime monitor continues to monitor the input queue at 210 and to monitor the cluster operation at 220. If so, the program complexity analysis module 120 may, at 250, load the batch of one or more programs 142 for analysis.

At 260, the program complexity analysis module may analyze each program in the batch to determine an I/O complexity graph and an operation complexity graph for each program. For example, the I/O complexity module 124 may parse commands in each program in the batch to identify one or more I/O complexity parameters and the operation complexity module may parse commands in each program of the batch to identify one or more operation complexity parameters. The graph generator 126 may then generate an operational complexity graph based on the operation complexity parameters and historical information stored in the knowledge data store 190 and an I/O complexity graph based on the I/O complexity parameters and historical information stored in the knowledge data store 190. The graph generator 126 may communicate the I/O complexity graph and the operation complexity graph to the resource allocation manager and/or store the information in the knowledge data store 190.

At 270, the resource allocation manager may allocate cluster computing resources based on a machine learning algorithm, the I/O complexity graph, the operation complexity graph historical information in the knowledge data store, system parameter settings, weightings, and multipliers corresponding to system and network information identified by the reconfiguration module and the like. For example, the resource allocation manager may assign an execution policy (e.g., First come-First Served (FCFS), Long Job First (LJF), Highest Complexity Job First (HCJF), and the like), a number of worker nodes, an amount of memory associated with each worker node, an amount of memory associated with an orchestrator node, a number of processors/processor cores associated with each node, and the like and additionally based on cluster computing framework status and configuration information received from the cluster computing framework, such as from the resource manager 160. Once the cluster computing system resources have been allocated and an execution plan has been identified, the resource allocation manager may initiate processing of the batch of one or more programs 142 by the cluster computing framework at 280.

Figure 6:
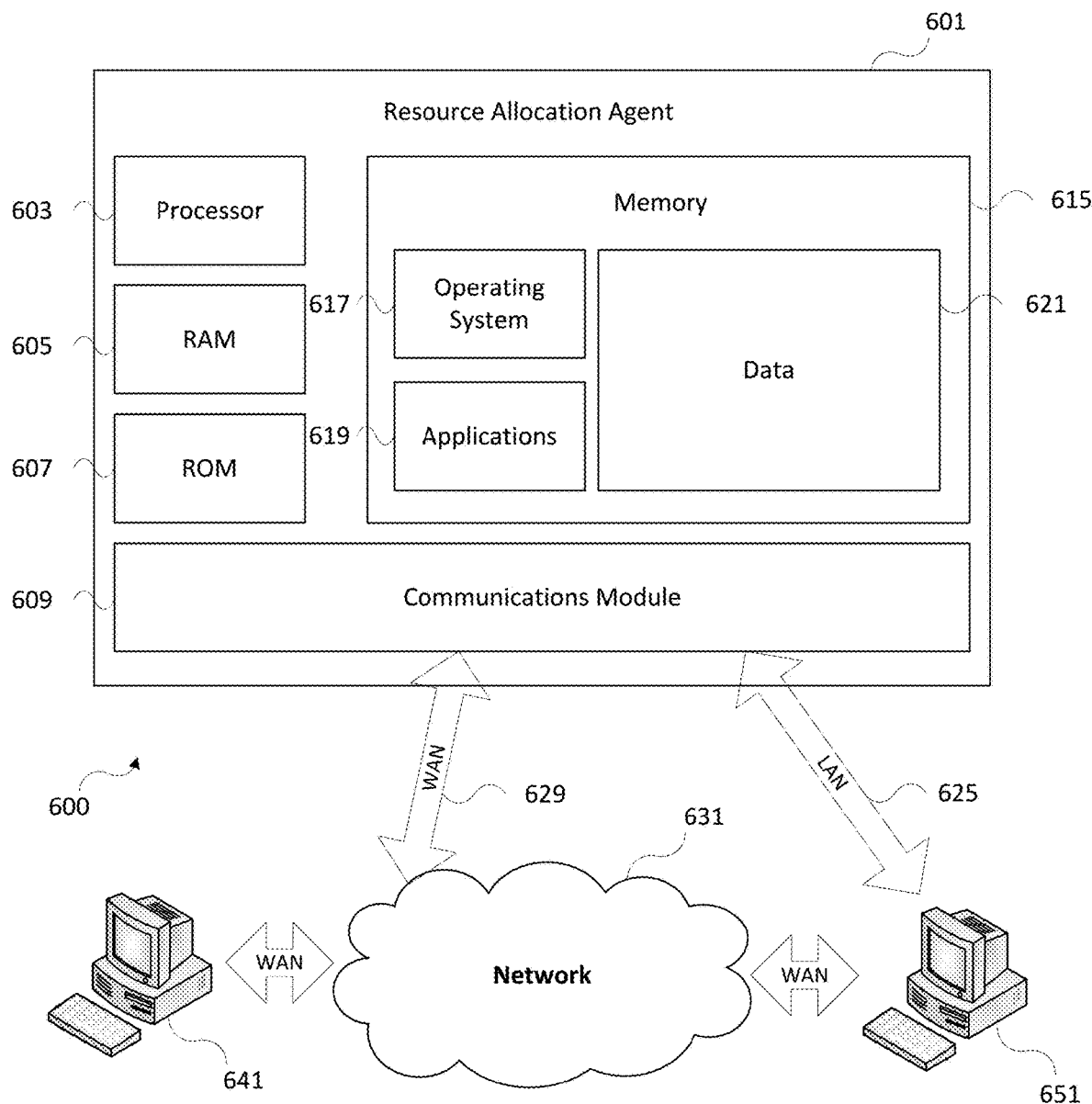
FIG. 6 shows an illustrative operation complexity graph operating environment in which various aspects of the disclosure may be implemented in accordance with one or more aspects described herein.

FIG. 6 shows an illustrative operating environment in which various aspects of the present disclosure may be implemented in accordance with one or more example embodiments. Referring to FIG. 6, a computing system environment 600 may be used according to one or more illustrative embodiments. The computing system environment 600 is only one example of a suitable computing environment and is not intended to suggest any limitation as to the scope of use or functionality contained in the disclosure. The computing system environment 600 should not be interpreted as having any dependency or requirement relating to any one or combination of components shown in the illustrative computing system environment 600.

The computing system environment 600 may include an illustrative resource allocation agent 601 having a processor 603 for controlling overall operation of the resource allocation agent 601 and its associated components, including a Random Access Memory (RAM) 605, a Read-Only Memory (ROM) 607, a communications module 609, and a memory 615. The resource allocation agent 601 may include a variety of computer readable media. Computer readable media may be any available media that may be accessed by the resource allocation agent 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the resource allocation agent 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 603 of the resource allocation agent 601. Such a processor may execute computer-executable instructions stored on a computer-readable medium.

Software may be stored within the memory 615 and/or other digital storage to provide instructions to the processor 603 for enabling the resource allocation agent 601 to perform various functions as discussed herein. For example, the memory 615 may store software used by the resource allocation agent 601, such as an operating system 617, one or more application programs 619, and/or an associated database 621. In addition, some or all of the computer executable instructions for the resource allocation agent 601 may be embodied in hardware or firmware. Although not shown, the RAM 605 may include one or more applications representing the application data stored in the RAM 605 while the resource allocation agent 601 is on and corresponding software applications (e.g., software tasks) are running on the resource allocation agent 601.

The communications module 609 may include a microphone, a keypad, a touch screen, and/or a stylus through which a user of the resource allocation agent 601 may provide input, and may include one or more of a speaker for providing audio output and a video display device for providing textual, audiovisual and/or graphical output. The computing system environment 600 may also include optical scanners (not shown).

The resource allocation agent 601 may operate in a networked environment supporting connections to one or more remote computing devices, such as the computing devices 641 and 651. The computing devices 641 and 651 may be personal computing devices or servers that include any or all of the elements described above relative to the resource allocation agent 601.

The network connections depicted in FIG. 6 may include a Local Area Network (LAN) 625 and/or a Wide Area Network (WAN) 629, as well as other networks. When used in a LAN networking environment, the resource allocation agent 601 may be connected to the LAN 625 through a network interface or adapter in the communications module 609. When used in a WAN networking environment, the resource allocation agent 601 may include a modem in the communications module 609 or other means for establishing communications over the WAN 629, such as a network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
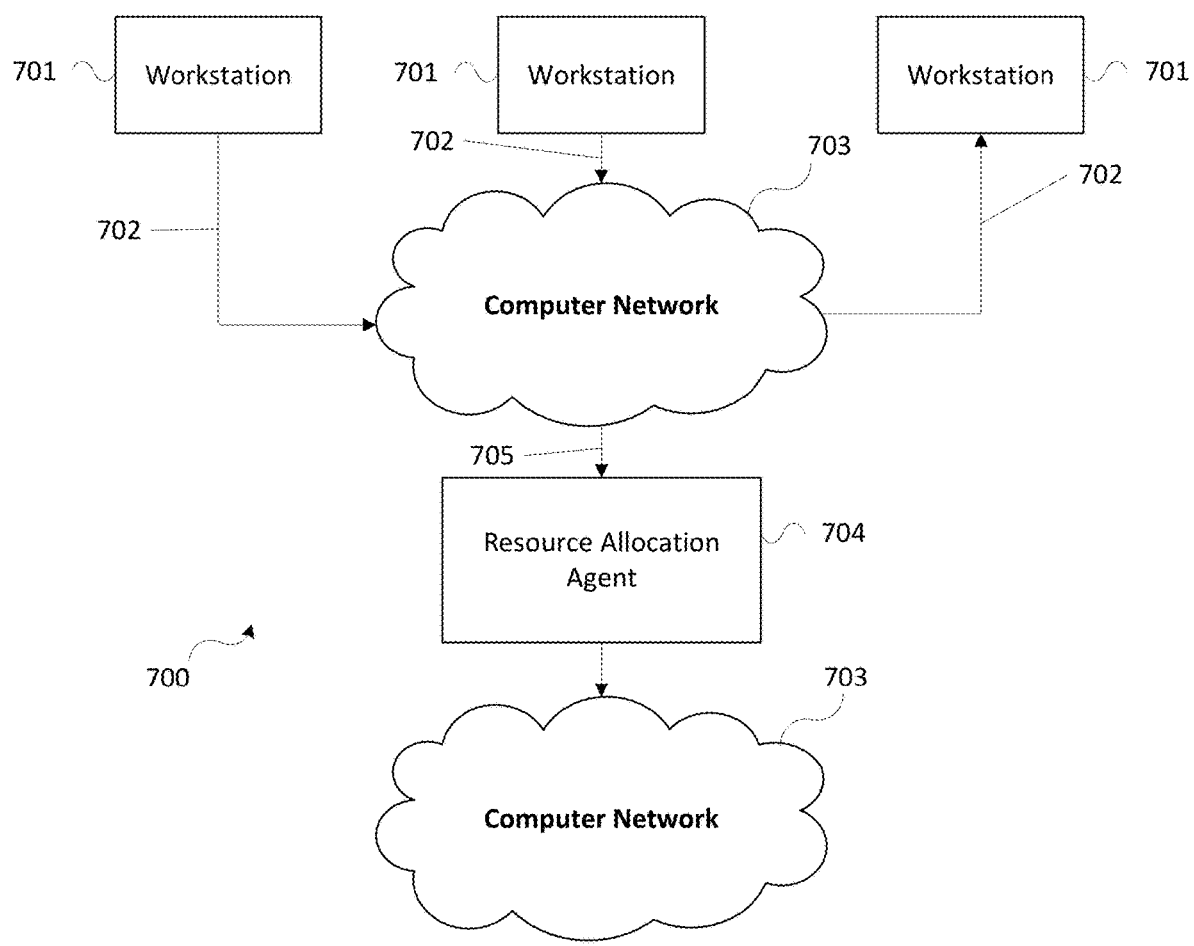
FIG. 7 shows an illustrative block diagram of workstations and servers that may be used to implement the processes and functions of certain aspects of the present disclosure in accordance with one or more aspects described herein.

FIG. 7 shows an illustrative block diagram of workstations and servers that may be used to implement the processes and functions of certain aspects of the present disclosure in accordance with one or more example embodiments. For example, an illustrative system 700 may be used for implementing illustrative embodiments according to the present disclosure. As illustrated, the system 700 may include one or more workstation computers 701. The workstation 701 may be, for example, a desktop computer, a smartphone, a wireless device, a tablet computer, a laptop computer, and the like, configured to perform various processes described herein. The workstations 701 may be local or remote, and may be connected by one of the communications links 702 to a computer network 703 that is linked via the communications link 705 to the resource allocation agent 704. In the system 700, the resource allocation agent 704 may be a server, processor, computer, or data processing device, or combination of the same, configured to perform the functions and/or processes described herein. The resource allocation agent 704 may be used to receive check images and associated data and/or validation scores, retrieve user profile, evaluate the check image compared to the user profile, identify matching or non-matching elements, generate user interfaces, and the like.

The computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 702 and 705 may be communications links suitable for communicating between the workstations 701 and the resource allocation agent 704, such as network links, dial-up links, wireless links, hardwired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing system, comprising:
   a resource allocation computing device comprising a processor; and
   memory storing computer-readable instructions that, when executed by the processor, cause the resource allocation computing device to:
      monitor an input queue of a cluster computing framework to identify one or more program files in the input queue, wherein each of the one or more program files comprise a plurality of commands;
      parse commands in each of the one or more program files;
      determine, based on parsed commands and by an I/O complexity module, an input/output (I/O) complexity parameter, wherein the I/O complexity parameter corresponds to a complexity of I/O usage required by operations in a program, wherein I/O usage required by operations in the program comprises a combination of local memory access, disk access, and network memory access, wherein a value of the I/O complexity parameter is determined based on weighting values associated with local memory access, disk access, and network memory access;
      determine, based on the parsed commands and by an operations complexity module, at least one operation complexity parameter corresponding to each program of the one or more program files, wherein the at least one operation complexity parameter value comprises a weighted combination of complexity values corresponding to a number of computation intensive operations to be performed in the program;
      trigger execution of the one or more program files by a resource allocation manager of the cluster computing framework via a network communication, wherein the cluster computing framework is configured based on program execution weights assigned to each program of the one or more program files, wherein the program execution weights are determined based on a product of a program priority and a sum of the I/O complexity parameter of the program and the at least one operation complexity parameter of the program; and
   the cluster computing framework configured to execute the one or more program files in response to the network communication, wherein the cluster computing framework comprises a distributed runtime environment comprising an orchestrator node computing device and a plurality of worker nodes and wherein operation of the plurality of the worker node computing devices is managed by the orchestrator node computing device.

2. The computing system of claim 1, wherein the instructions, when executed, cause the resource allocation computing device to:
   configure the cluster computing framework based on the I/O complexity parameter and the at least one operation complexity parameter corresponding to each program of the one or more program files, wherein the I/O complexity parameter corresponds to a number of times data is accesses by the commands in each of the one or more program files, wherein data access occurs in one or more of a local memory, a data storage device, and via a network connection.

3. The computing system of claim 1, wherein the instructions, when executed, cause the resource allocation computing device to:

determine, based on a data latency associated with each command of a plurality of commands included in a first program, a first I/O complexity parameter associated with the first program.

4. The computing system of claim 1, wherein the instructions, when executed, cause the resource allocation computing device to:
configure the cluster computing framework based on the I/O complexity parameter and the operation complexity parameter corresponding to each program of the one or more program files and on historical performance information corresponding to historical processing of programs by the cluster computing framework.

5. The computing system of claim 4, wherein determining of the operation complexity parameter comprises:
determine, based on the parsed commands, a memory weighting parameter based on a size of a data file input.

6. The computing system of claim 1, wherein determining of the I/O complexity parameter comprises:
determining, based on the parsed commands, a first number of commands that access data stored in local memory of a cluster computing node, a second number of commands that access data stored on a storage device, and a third number of commands that access data via a network connection, wherein the cluster computing framework is configured at least in part based on the first number of commands, the second number of commands, and the third number of commands.

7. The computing system of claim 1, wherein determining of the operation complexity parameter comprises:
determining, based on the parsed commands, a first number of commands that access data stored in local memory of a cluster computing node, a second number of commands that access data stored on a storage device, and a third number of commands that access data via a network connection, wherein the cluster computing framework is configured at least in part based on the first number of commands, the second number of commands, and the third number of commands.

8. The computing system of claim 1, wherein the instructions, when executed, cause the resource allocation computing device to:
revise, using a machine learning, a calculation to determine the operation complexity parameter.

9. The computing system of claim 1, wherein the instructions, when executed, cause the resource allocation computing device to:
update, using a machine learning, a calculation to determine the I/O complexity parameter.

10. The computing system of claim 1, wherein the instructions, when executed, cause the resource allocation computing device to:
update, using a machine learning, one or more configuration weighting parameters for configuring the cluster computing framework for processing the one or more program files.

11. A method comprising:
monitoring, by a resource monitor of a first computing device, an input queue of a cluster computing framework to identify one or more program files to be processed by the cluster computing framework, wherein each of the one or more program files comprise a plurality of commands;
parsing, by a complexity module of the first computing device, after identification of a program batch in the input queue, commands in each of one or more program files of the program batch;
determining, by the complexity module and based on parsed commands, an input/output (I/O) complexity parameter and at least one operation complexity parameter corresponding to each program of the one or more program files, wherein the I/O complexity parameter corresponds to a complexity of I/O usage required by the operations in a program and the operation complexity parameter corresponds to the complexity of the operations processed by the program, wherein I/O usage required by operations in the program comprises a combination of at least two of memory access, disk access, and network access and wherein a value of the I/O complexity parameter is determined based on a first weighting value associated with I/O usage comprising memory access, a second weighting value associated with I/O usage comprising disk access, and a third weighting value associated with I/O usage comprising network access;
configuring, by a resource allocation computing device and via a network, a cluster computing framework based on the I/O complexity parameter and the at least one operation complexity parameter, wherein the at least one operation complexity parameter comprises a weighted combination of complexity values corresponding to a number of computation intensive operations to be performed in the program, and wherein the configuration comprises a program execution policy, an indication of a number of worker nodes, an indication of an amount of memory associated with each worker node, an indication of an amount of memory associated with an orchestrator node, and an indication of a number of processors/processor cores associated with each node; and
trigger, by the resource allocation computing device via a command sent via a network to the cluster computing framework, execution of the one or more program files by the cluster computing framework based on program execution weights assigned to each program of the one or more program files, wherein the program execution weights are determined based on a product of a program priority and a sum of the I/O complexity parameter of the program and the at least one operation complexity parameter of the program.

12. The method of claim 11, wherein the I/O complexity parameter corresponds to a number of times data is accesses by the commands in each of the one or more programs, wherein data access occurs in one or more of a local memory, a data storage device, and via a network connection.

13. The method of claim 11, wherein determining the I/O complexity parameter comprises:
determining, based on a data latency associated with each command of a plurality of commands included in a first program, the I/O complexity parameter associated with the first program.

14. The method of claim 11, wherein determining the at least one operation complexity parameter comprises:
determining, based on a computational load associated with each command of a plurality of commands included in a first program, a first computational load complexity parameter associated with the first program; and determining, based on a memory requirement associated with the first program, a second memory requirement complexity parameter associated with the first program.

15. The method of claim 11, comprising:
configuring the cluster computing framework based on the I/O complexity parameter and the operation complexity parameter corresponding to each program of the one or more program files and on historical performance information corresponding to historical processing of programs by the cluster computing framework.

16. The method of claim 11, wherein determining the I/O complexity parameter comprises:
determining, based on the parsed commands, a first number of commands that access data stored in local memory of a cluster computing node, a second number of commands that access data stored on a storage device, and a third number of commands that access data via a network connection, wherein a cluster computing framework configuration is determined, at least in part, based on the first number of commands, the second number of commands, and the third number of commands.

17. The method of claim 11, wherein determining of the operation complexity parameter comprises:
determining, based on the parsed commands, a first number of commands that access data stored in local memory of a cluster computing node, a second number of commands that access data stored on a storage device, and a third number of commands that access data via a network connection, wherein a cluster computing framework configuration is determined, at least in part, based on the first number of commands, the second number of commands, and the third number of commands.

18. The method of claim 11, wherein determining the operation complexity parameter comprises:
determining, based on the parsed commands, a memory weighting parameter based on a size of a data file input.

19. The method of claim 11, comprising:
updating, using a machine learning, a first weighting factor used in a calculation to determine the operation complexity parameter.

20. The computing system of claim 11, wherein the instructions, when executed, cause the resource allocation computing device to:
update, using a machine learning, a second weighting factor used in a calculation to determine the I/O complexity parameter.

* * * * *